(12) United States Patent
Datz et al.

(10) Patent No.: US 11,434,801 B2
(45) Date of Patent: Sep. 6, 2022

(54) EXHAUST GAS TREATMENT SYSTEM FOR AN EXHAUST SYSTEM OF AN INTERNAL COMBUSTION ENGINE AND PROCESS FOR OPERATING SUCH AN EXHAUST GAS TREATMENT SYSTEM

(71) Applicant: Eberspächer Exhaust Technology GmbH, Neunkirchen (DE)

(72) Inventors: Wolfgang Datz, Tübingen (DE); Lisa Zimmermann, Esslingen (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 17/197,973

(22) Filed: Mar. 10, 2021

(65) Prior Publication Data

US 2021/0285351 A1    Sep. 16, 2021

(30) Foreign Application Priority Data

Mar. 13, 2020 (DE) ...................... 10 2020 106 882.4

(51) Int. Cl.
| | |
|---|---|
| *F01N 3/20* | (2006.01) |
| *F01N 3/28* | (2006.01) |
| *F01N 13/00* | (2010.01) |
| *F01N 3/021* | (2006.01) |
| *F01N 3/10* | (2006.01) |

(52) U.S. Cl.
CPC ............. *F01N 3/208* (2013.01); *F01N 3/021* (2013.01); *F01N 3/103* (2013.01); *F01N 3/2066* (2013.01); *F01N 3/2803* (2013.01); *F01N 13/009* (2014.06); *F01N 13/011* (2014.06); *F01N 2240/36* (2013.01); *F01N 2410/06* (2013.01); *F01N 2900/08* (2013.01)

(58) Field of Classification Search
CPC .......... F01N 3/208; F01N 3/021; F01N 3/103; F01N 3/2066; F01N 3/2803; F01N 13/009; F01N 13/011; F01N 2240/36; F01N 2410/06; F01N 2900/08; F01N 9/00; Y02T 10/12; Y02T 10/40
See application file for complete search history.

(56) References Cited

U.S. PATENT DOCUMENTS

| | | | |
|---|---|---|---|
| 2011/0058999 A1* | 3/2011 | Ettireddy | ................ B01J 23/20 423/213.5 |
| 2014/0116027 A1* | 5/2014 | Ancimer | ................ F01N 3/031 60/274 |
| 2015/0231567 A1* | 8/2015 | Golin | ................ F01N 13/0097 422/110 |
| 2015/0337702 A1 | 11/2015 | Ettireddy et al. | |

(Continued)

FOREIGN PATENT DOCUMENTS

| | | |
|---|---|---|
| DE | 102006014073 A1 | 10/2007 |
| DE | 102016102356 A1 | 9/2016 |

(Continued)

*Primary Examiner* — Brandon D Lee
(74) *Attorney, Agent, or Firm* — McGlew and Tuttle, P.C.

(57) ABSTRACT

An exhaust gas treatment system is provided for an exhaust system of an internal combustion engine. The exhaust gas treatment system includes a plurality of SCR catalytic converter units (32, 34, 36) connected in parallel to one another. At least one SCR catalytic converter unit (32, 34, 36) of the SCR catalytic converter units (32, 34, 36) is connected in parallel to one another can optionally be released and blocked for the flow of exhaust gas.

20 Claims, 2 Drawing Sheets

(56) References Cited

U.S. PATENT DOCUMENTS

2016/0251989 A1  9/2016 Upadhyay
2018/0272281 A1* 9/2018 Makino .................... B01J 35/04

FOREIGN PATENT DOCUMENTS

| DE | 112015002447 T5 | 3/2017 | |
|----|-----------------|--------|---|
| EP | 2216523 A1 | 8/2010 | |
| JP | H5-263631 A | 10/1993 | |
| JP | 2003-184542 A | 7/2003 | |
| JP | 2010-121521 A | 6/2010 | |
| JP | 2010-185434 A | 8/2010 | |
| JP | 2011-185099 A | 9/2011 | |
| JP | 2013-124610 A | 6/2013 | |
| JP | 2013-221466 A | 10/2013 | |
| JP | 2014-227978 A | 12/2014 | |
| JP | 2019-190425 A | 10/2019 | |
| WO | WO-2010054034 A2 * | 5/2010 | .......... B01J 37/0246 |
| WO | 2015179720 A1 | 11/2015 | |

\* cited by examiner

EXHAUST GAS TREATMENT SYSTEM FOR AN EXHAUST SYSTEM OF AN INTERNAL COMBUSTION ENGINE AND PROCESS FOR OPERATING SUCH AN EXHAUST GAS TREATMENT SYSTEM

CROSS REFERENCE TO RELATED APPLICATIONS

This application claims the benefit of priority under 35 U.S.C. § 119 of German Application 10 2020 106 882.4, filed Mar. 13, 2020, the entire contents of which are incorporated herein by reference.

TECHNICAL FIELD

The present invention pertains to an exhaust gas treatment system for an exhaust system of an internal combustion engine, for example, in a utility vehicle, which is configured to operate to reduce a percentage of harmful substances in the exhaust gas discharged by the internal combustion engine. The present invention further pertains to a process for operating such an exhaust gas treatment system.

TECHNICAL BACKGROUND

SCR (Selective Catalytic Reduction) catalytic converter units are used in vehicles with diesel internal combustion engines, for example, in utility vehicles, in order to reduce the percentage of nitrogen oxides in the exhaust gas. A mixture of urea and water is injected as a reducing agent into the exhaust gas stream upstream of such SCR catalytic converter units. The mixture of exhaust gas and reducing agent generated in the area of a mixer or upstream of a respective SCR catalytic converter unit is reacted in a catalytic reaction in a respective SCR catalytic converter unit.

SUMMARY

An object of the present invention is to provide an exhaust gas treatment system for an exhaust system of an internal combustion engine and a process for operating such an exhaust gas treatment system, with which exhaust gas treatment system and process an improved adaptation to different operating states of an internal combustion engine is achieved.

According to a first aspect, this object is accomplished by an exhaust gas treatment system for an exhaust system of an internal combustion engine comprising a plurality of SCR catalytic converter units connected in parallel to one another, wherein at least one SCR catalytic converter unit of the SCR catalytic converter units connected in parallel to one another can optionally be released and blocked for the flow of exhaust gas.

The possibility of not releasing all the SCR catalytic converter units connected in parallel to one another simultaneously for the flow of exhaust gas is created in the exhaust gas treatment system configured according to the present invention. This offers, for example, the possibility of concentrating the exhaust gas stream to one SCR catalytic converter unit or to a reduced number of SCR catalytic converter units or to concentrate it to one or more SCR catalytic converter units, which is or are especially adapted for an operation with a reduced temperature, during a start operating phase, i.e., when the system is comparatively cold and has a low exhaust gas temperature. It is guaranteed hereby that this SCR catalytic converter unit or these SCR catalytic converter units, through which unit or units flow takes place during the start operating phase, is/are heated comparatively rapidly and that a temperature necessary for the onset of the catalytic reaction in a respective SCR catalytic converter unit is thus reached more rapidly. If the system has been heated and if the exhaust gas has a higher temperature, other or more SCR catalytic converter units can additionally be connected or operated in order to provide optimal conditions for the exhaust gas treatment for this operation.

In order to make it possible to ensure a high flexibility during the operation, it is proposed that each of the SCR catalytic converter units connected in parallel to one another can optionally be released and blocked for the flow of exhaust gas.

For example, at least one blocking element may be provided for optionally releasing and blocking the at least one SCR catalytic converter unit of the SCR catalytic converter units connected in parallel, which SCR catalytic converter unit can optionally be released and blocked for the flow, wherein a blocking element is preferably assigned for a high flexibility to each SCR catalytic converter unit of the SCR catalytic converter units connected in parallel to one another, which SCR catalytic converter unit can optionally be released and blocked for the flow of exhaust gas.

For an adaptation of the exhaust gas treatment system to different operating phases of an internal combustion engine or of an exhaust system associated with the latter, provisions may be made, for example, for at least two SCR catalytic converter units of the SCR catalytic converter units connected in parallel to one another to have mutually different catalytic converter capacities.

Such different catalytic converter capacities may be achieved by, for example, the SCR catalytic converter units, which are connected in parallel to one another and have mutually different catalytic converter capacities, having mutually different catalytic converter surfaces effective for a catalytic reaction or/and different $NH_3$ storage volumes.

The SCR catalytic converter units connected in parallel to one another may have a preferably extruded substrate, which is coated with a catalytically active material or is made with a catalytically active material, wherein exhaust gas flow cells are formed in each substrate, wherein at least two SCR catalytic converter units connected in parallel to one another
- have substrates with different numbers or/and densities of exhaust gas flow cells, or/and
- have substrates with different wall thicknesses between mutually adjacent exhaust gas flow cells, or/and
- have substrates with different cross-sectional dimensions or/and cross-sectional geometries of the exhaust gas flow cells provided in them, or/and
- have substrates with different cross-sectional dimensions or/and lengths in the exhaust gas flow direction or/and volumes, or/and
- have substrates with different substrate-forming materials, or/and
- have substrates with different porosities of the substrate-forming materials, or/and
- have preferably extruded substrates coated or made with different catalytically active materials.

An optimal adaptation to different temperature states and to different load states can be achieved, for example, by at least one of the SCR catalytic converter units connected in parallel to one another being configured with a substrate with an exhaust gas flow cell density in the range of 1290 to 2580 exhaust gas flow cells per $cm^2$, or/and with a substrate with a substrate diameter in the range of 14 cm to 27 cm, or/and with a substrate with a substrate-forming material having a higher porosity and by at least one of the SCR catalytic converter units connected in parallel to one another being configured with a substrate with an exhaust gas flow cell density in the range of 2580 to 3870 exhaust gas flow cells per $cm^2$, or/and with a substrate with a substrate diameter in the range of 24 cm to 33 cm, or/and with a substrate with a substrate-forming material having a lower porosity.

For an even more reduced percentage of pollutants in the exhaust gas, at least one catalytic converter unit connected in series to the SCR catalytic converter units connected in parallel to one another may be provided or/and at least one particle filter unit connected in series to the SCR catalytic converter units connected in parallel to one another may be provided.

For example, a catalytic converter unit connected in series to the SCR catalytic converter units connected in parallel to one another may be an oxidation catalytic converter unit or/and a catalytic converter unit connected in series to the SCR catalytic converter units connected in parallel to one another may be an SCR catalytic converter unit.

In order to make it possible to reach a high flexibility during the operation in connection with such an SCR catalytic converter unit connected in series as well, a blocking element for optionally releasing and blocking the flow of exhaust gas may be associated with at least one SCR catalytic converter unit connected in series to the SCR catalytic converter units connected in parallel to one another.

At least one reactant introduction unit may be provided upstream in relation to each SCR catalytic converter unit for injecting the reducing agent necessary for the selective catalytic reduction.

According to another aspect, the object indicated in the introduction is accomplished by a process for operating an exhaust gas treatment system configured according to the present invention in an exhaust system of an internal combustion engine, in which process not all the SCR catalytic converter units connected in parallel to one another are released for the flow of exhaust gas during a start operating phase or during a low-load operating phase of the internal combustion engine.

Since exhaust gas flows through only some and, for example, only through a single one of the SCR catalytic converter units connected in parallel to one another during the start operating phase or during the low-load operating phase of the internal combustion engine when the system is comparatively cold and the exhaust gas temperature is low, a concentration to a comparatively small volume to be heated and hence a more rapid onset of the catalytic reaction are achieved.

In order to make it possible to guarantee optimal exhaust gas purification after a longer operation, i.e., when the system has been heated up and the exhaust gas temperature has increased, it is proposed that during a first load operating phase of the internal combustion engine, which is different from the start operating phase or from the low-load operating phase, at least one SCR catalytic converter unit of the SCR catalytic converter units connected in parallel to one another, which said SCR catalytic converter unit is released for the flow of exhaust gas during the start operating phase or during the low-load operating phase, and at least one SCR catalytic converter unit of the SCR catalytic converter units connected in parallel to one another, which said SCR catalytic converter unit is not released for the flow of exhaust gas during the start operating phase or during the low-load operating phase, be released for the flow of exhaust gas.

Provisions may be made, for example, for not all of the SCR catalytic converter units of the SCR catalytic converter units connected in parallel to one another, which former SCR catalytic converter units are not released for the flow of exhaust gas during the start operating phase or during the low-load operating phase, be released simultaneously for the flow of exhaust gas during the first load operating phase.

In order to ensure that an approximately uniform load and hence also an approximately uniform aging of the SCR catalytic converter units is achieved over the service life, it is proposed that SCR catalytic converter units of the SCR catalytic converter units connected in parallel to one another, which former SCR catalytic converter units were not released for the flow of exhaust gases in the start operating phase or in the low-load operating phase, be released alternatingly for the flow of exhaust gas.

Further, provisions may be made in a second load operating phase of the internal combustion engine, which is different from a start operating phase or from a low-load operating phase, for no SCR catalytic converter unit of the SCR catalytic converter units connected in parallel to one another, which SCR catalytic converter unit was released for the flow of exhaust gas during the start operating phase or during the low-load operating phase, to be released for the flow of exhaust gas, and for at least one SCR catalytic converter unit of the SCR catalytic converter units connected in parallel to one another, which SCR catalytic converter unit was not released for the flow of exhaust gas during the second load operating phase, and preferably for each SCR catalytic converter unit of the SCR catalytic converter units connected in parallel to one another, which SCR catalytic converter unit was not released for the flow of exhaust gas during the start operating phase or during the low-load operating phase, to be released for the flow of exhaust gas. An overload of the SCR catalytic converter unit or SCR catalytic converter units active during the start operating phase or during the low-load operating phase can thus be avoided.

Provisions may be made in a third load operating phase of the internal combustion engine, which is different from a start operating phase, for no SCR catalytic converter unit of the SCR catalytic converter units connected in parallel to one another, which SCR catalytic converter unit was not released for the flow of exhaust gas during the start operating phase, to be released for the flow of exhaust gas. Consequently, only the SCR catalytic converter unit or only the SCR catalytic converter units of the SCR catalytic converter units connected in parallel to one another, which former SCR catalytic converter unit or which former SCR catalytic converter units is/are also active during the start operating phase, is/are operated during this operating phase.

The first load operating phase may be a partial load operating phase of the internal combustion engine, the second load operating phase may be a full load operating phase of the internal combustion engine, and the third load operating phase may be a low-load operating phase.

The ending of the start operating phase may be marked for the purposes of the present invention by, for example, the expiration of a predefined time period beginning from the putting into operation of the internal combustion engine or/and by the reaching of a predefined exhaust gas temperature or/and by the reaching of a predefined temperature in the area of the exhaust gas treatment system. A low-load operating phase may be an operating phase during which the speed of the internal combustion engine or/and a driving torque or the power demand on the internal combustion engine does not exceed a first load limit value when the internal combustion engine is warmed up and the exhaust system is warmed up. A partial load operating phase may be characterized, for example, by the speed of the internal combustion engine or/and by the driving torque delivered by the internal combustion engine or the power demand on the internal combustion engine is above the first load limit value but it does not exceed a second load limit value that is above the first load limit value, while the full load operating phase is characterized in that the speed or/and the driving torque delivered by the internal combustion engine or the power demand on the internal combustion engine is above the second load limit value.

In a procedure that is especially advantageous for an efficient exhaust gas purification, at least one SCR catalytic converter unit released for the flow of exhaust gas during the start operating phase or/and during the low-temperature operating phase may have a substrate with an exhaust gas flow cell density in the range of 1290 to 2580 exhaust gas flow cells per $cm^2$ or/and with a substrate diameter in the range of 14 cm to 27 cm and with a substrate-forming material having a higher porosity, and at least one SCR catalytic converter unit released for the flow of exhaust gas during a partial load operating phase or/and during a full load operating phase of the internal combustion engine may have a substrate with an exhaust gas flow cell density in the range of 2580 to 3870 exhaust gas flow cells per $cm^2$ or/and with a substrate diameter in the range of 24 cm to 33 cm or/and with a substrate-forming material having a lower porosity.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
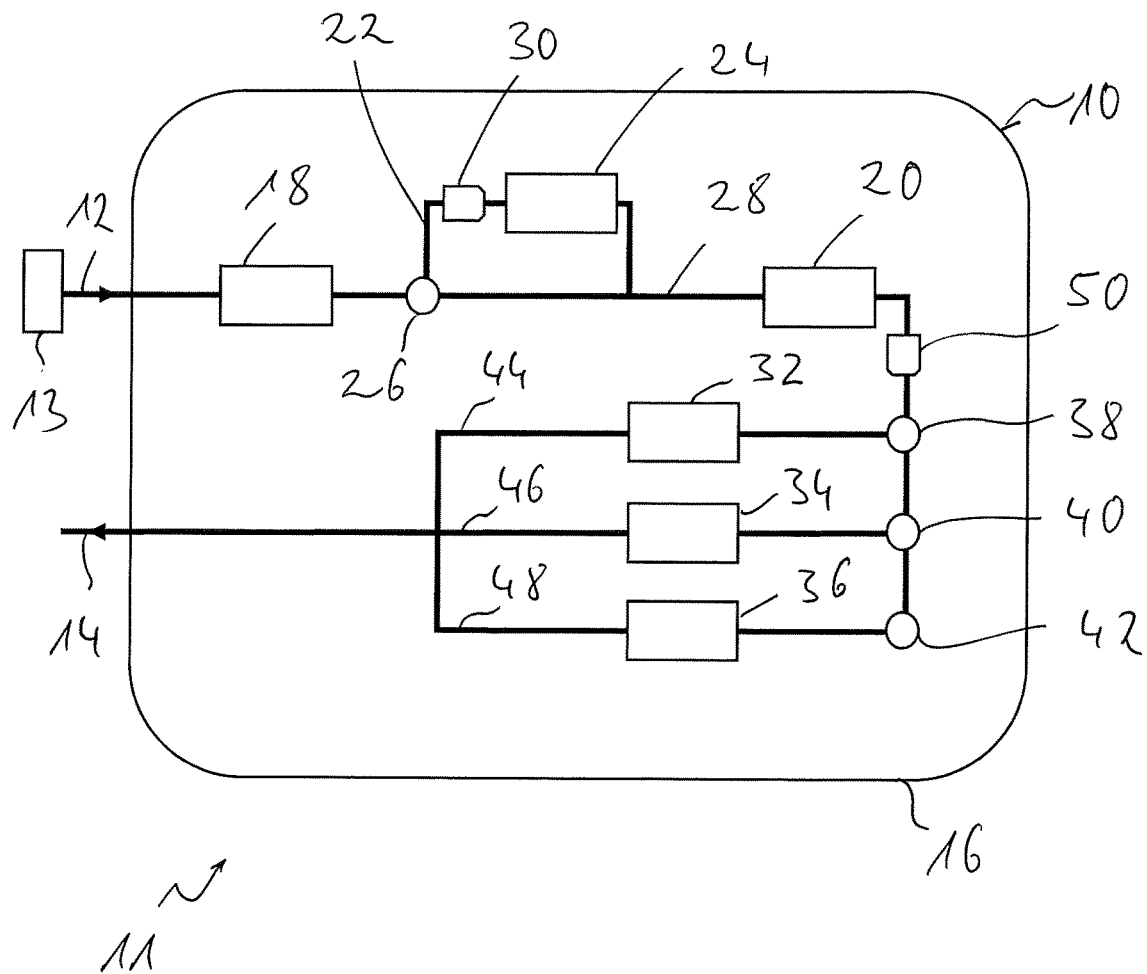
FIG. 1 is a schematic diagram of an exhaust gas treatment system for an exhaust system of an internal combustion engine.

Referring to the drawings, an exhaust gas treatment system 10 shown in FIG. 1 for an exhaust system 11 of an internal combustion engine 13 comprises an inlet area 12, in which the exhaust gas discharged by the internal combustion engine 13 enters the exhaust gas treatment system 10. The exhaust gas treated in the exhaust gas treatment system 10 leaves the exhaust gas treatment system 10 in an outlet area 14. The different system areas of the exhaust gas treatment system 10, which will be described below, may be accommodated in a housing 16, which may be divided into a plurality of housing areas connected to one another via ducts or lines.

The exhaust gas treatment system 10 comprises, following the inlet area 12, a diesel oxidation catalytic converter 18. The diesel oxidation catalytic converter 18 is followed by a particle filter 20. An SCR catalytic converter unit 24 is provided in a bypass flow path 22 in the exhaust gas flow path between the diesel oxidation catalytic converter 18 and the particle filter 20. A blocking element 26, for example, a valve, which can optionally release the bypass flow path 22 branching off from an exhaust gas main flow duct 28 optionally for the flow of exhaust gas and block this bypass flow path against the flow of exhaust gas, is associated with the SCR catalytic converter unit 24. The blocking element 26 may be configured in this case such that when flow shall take place through the SCR catalytic converter unit 24, it guides the total quantity of exhaust gas stream flowing in the exhaust gas main flow duct 28 through the bypass flow path 22. As an alternative, the blocking element 26 may be such that it guides a, for example, variable percentage of the exhaust gas stream into the bypass flow path 22 and hence through the SCR catalytic converter unit 24.

A reactant introduction unit 30, generally also called injector, is provided upstream of the SCR catalytic converter unit 24, for example, in the bypass flow path 22. The reactant introduction unit 30 releases a reactant, for example, the urea/water mixture used as a reducing agent for the SCR reaction, into the exhaust gas stream. The mixing of exhaust gas and reactant can be supported in a mixer, which follows, for example, the reactant introduction unit 30. It should be noted that the reactant introduction unit 30 could also be provided, for example, in the bypass flow path 22 upstream in relation to the SCR catalytic converter unit 24.

Three SCR catalytic converter units 32, 34, 36, which are connected in parallel to one another, are provided downstream in relation to the particle filter 20 in the shown exemplary embodiment of an exhaust gas treatment system 10. In association with each of these SCR catalytic converter units 32, 34, 36 connected in parallel, a respective blocking element 38, 40, 42, for example, a valve, is provided in the exhaust gas main flow duct 28. Each of these blocking elements 38, 40, 42 is configured to guide the exhaust gas stream or a part of the exhaust gas stream flowing in the exhaust gas main flow duct 28 into a branch line 44, 46, 48 containing a respective SCR catalytic converter unit 32, 34, 36 each. Each of the SCR catalytic converter units 32, 34, 36 connected in parallel to one another, with the branch line configuration 44, 46, 48, can thus optionally be released for the flow of exhaust gas and blocked against the flow of exhaust gas with the blocking elements 38, 40, 42.

An additional reactant introduction unit 50 is provided upstream of the SCR catalytic converter units 32, 34, 36 connected in parallel to one another and upstream of the blocking elements 38, 40, 42 associated with these. This injects the reactant necessary for carrying out the catalytic reaction in the SCR catalytic converter units 32, 34, 36, i.e., for example, a urea/water mixture, into the exhaust gas main flow duct 28, and a mixer for mixing the injected reactant with the exhaust gas may be associated with this reactant introduction unit 50 as well.

It should be noted that, as an alternative, a separate reactant introduction unit may also be associated in the respective branch line 44, 46, 48 with each of the individual SCR catalytic converter units 32, 34, 36 connected in parallel to one another upstream of a respective SCR catalytic converter unit 32, 34, 36.

The exhaust gas treatment system 10 shown in FIG. 1 has a great variability during the operation based on its structural configuration. Thus, a part of the nitrogen oxide content can already be removed with the optionally operable SCR catalytic converter unit 24, which is connected in series with the SCR catalytic converter units 32, 34, 36, which are connected in parallel with one another, just as the diesel oxidation catalytic converter 18 and the particle filter 20, when, for example, a high percentage of nitrogen oxides is present, for example, in a full load operating state of the internal combustion engine, and a large quantity of exhaust gas is discharged. The SCR catalytic converter units 32, 34, 36 connected in parallel to one another may likewise optionally be activated and deactivated as a function of the operating state of the internal combustion engine and of an exhaust gas treatment system. The SCR catalytic converter units 32, 34, 36 connected in parallel to one another may have, in principle, an identical design, but they may also have different configurations adapted to certain operating states in the manner described below.

During a start operating phase, during which the internal combustion engine 13 and the exhaust system 11 and hence also the exhaust gas treatment system 10 have a comparatively low temperature and the exhaust gas released by the internal combustion engine 13 also has a comparatively low temperature, the goal is to bring the exhaust gas treatment system 10 as quickly as possible into a state in which the temperature necessary for carrying out the selective catalytic reduction is reached. For example, only the SCR catalytic converter unit 32 can be released for this purpose for the flow of exhaust gas, whereas all other SCR catalytic converter units 24, 34, 36 are blocked against the flow of exhaust gas. The entire exhaust gas stream is thus passed through the only released SCR catalytic converter unit 32, so that it is guaranteed that this will be heated comparatively rapidly and it will thus reach the temperature necessary for carrying out the catalytic reaction comparatively rapidly as well.

After the end of this start operating phase, i.e., for example, when the internal combustion engine 13 or the exhaust system 11 and hence also the exhaust gas treatment system 10 have reached a sufficiently high temperature or/and the exhaust gas discharged by the internal combustion engine has reached a sufficiently high temperature, the SCR catalytic converter units 34, 36 can then be connected additionally as well. For example, the SCR catalytic converter unit 34 can additionally be released for the flow in a partial load operating phase, so that the total amount of the exhaust gas stream will be passed through the two SCR catalytic converter units 32, 34 connected in parallel to one another. In order to guarantee a uniform aging of the SCR catalytic converter units 32, 34, 36 connected in parallel to one another in such an operation, provisions may be made, for example, for alternatingly releasing the SCR catalytic converter unit 34 and the SCR catalytic converter unit 36 for the flow of exhaust gas, so that these will be loaded over an approximately equally long time over their service lives, i.e., exhaust gas will flow through them for an approximately equally long time. If all three SCR catalytic converter units 32, 34, 36 connected in parallel to one another have an identical design, the SCR catalytic converter unit 32 active during the start operating phase can also be included in this alternating switching, so that one of the three SCR catalytic converter units 32, 34, 36 connected in parallel to one another is always active during the start operating phase, but the active SCR catalytic converter unit is not always the same, and exhaust gas will always flow through two of the three SCR catalytic converter units 32, 34, 36 connected in parallel to one another during the partial load operating phase, while one is being blocked against the flow of exhaust gas.

All the SCR catalytic converter units through which there is no flow during the start operating phase, i.e., the SCR catalytic converter unit 34 and the SCR catalytic converter unit 36 of the SCR catalytic converter units 32, 34, 36 connected in parallel to one another, can be released for the flow of exhaust gas in a full load operating phase, and so can the SCR catalytic converter unit 24 connected in series thereto. The SCR catalytic converter unit 32 that is active during the start operating phase can be blocked against the flow of exhaust gas during a full load operating phase, so that an overload of this SCR catalytic converter unit 32 can be avoided over the service life. If all the SCR catalytic converter units 32, 34, 36 connected in parallel to one another have an identical design, provisions may be made in this case as well for a change of the SCR catalytic converter unit activated during the consecutive start operating phases, so that a uniform load of all SCR catalytic converter units 32, 34, 36 is achieved during the full load operating phases following a respective start operating phase as well.

The exhaust gas can flow through the SCR catalytic converter unit 32 that is active during the start operating phase during a low-load operating phase, while the other two SCR catalytic converter units 34, 36 are blocked. This also contributes to a more uniform load of all SCR catalytic converter units 32, 34,36 connected in parallel to one another.

As was described above, especially the SCR catalytic converter units 32, 34, 36 connected in parallel to one another may have an identical design. However, in order to adapt these in an optimized manner to the operating phases during which they shall preferably be used, the SCR catalytic converter units 32, 34, 36 connected in parallel to one another may also be, in principle, different from one another. In particular, these may differ from one another in at least one of the following parameters:

- the effective catalytic converter surface for carrying out the catalytic reaction,
- the substrate-forming material of a substrate coated with the catalytically active material,
- the porosity of the substrate-forming material,
- the number or the surface density of the exhaust gas flow cells provided in a respective substrate,
- the wall thickness of the walls separating the exhaust gas flow cells located adjacent to one another from one another in a respective substrate,
- the cross-sectional dimensions or/and the cross-sectional geometry of the exhaust gas flow cells,
- the cross-sectional dimension of a respective substrate,
- the length of a respective substrate in the exhaust gas flow direction,
- the volume of a respective substrate, and
- the catalytically active material.

Figure 2:
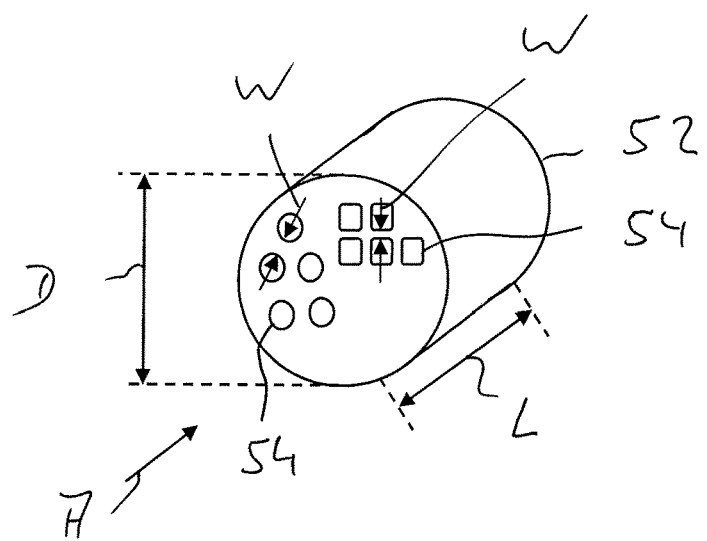
FIG. 2 is a schematic diagram of a substrate for an SCR catalytic converter unit.

FIG. 2 shows in a schematic diagram such a substrate 52 for an SCR catalytic converter unit. This substrate may have basically a cylindrical structure and a length L in the exhaust gas flow direction A in which the exhaust gas flows through the substrate 52 in the area of the exhaust gas flow cells 54 formed therein. In the configuration with a circular cross section, the substrate has a diameter D. Walls 56, which separate the individual exhaust gas flow cells 54 from one another, are formed between the exhaust gas flow cells 54, which may be configured essentially as ducts extending in the exhaust gas flow direction A. The exhaust gas flow ducts 54 may be distributed over the cross section of the substrate 52 in an essentially uniform distribution, so that approximately uniform wall thicknesses W of the walls 56 located between the exhaust gas flow cells 54 are also obtained, and the minimum wall thickness W between mutually adjacent exhaust gas flow cells 54 is always considered for the purposes of the present invention. As this is shown in FIG. 2, the exhaust gas flow cells 54 may have different cross-sectional geometries, for example, a round or an angular cross-sectional geometry, and preferably all the exhaust gas flow cells 54 provided in a substrate 52 have the same cross-sectional geometry.

The catalytically active material, which may be or may contain, for example, platinum, is provided on the surface of the substrate 52 around which exhaust gas flows. This may be brought about, for example, by the substrate being coated with such a catalytically active material, or by the catalytically active material being mixed into the substrate-forming material, so that the catalytic converter surface active for carrying out the catalytic reaction with the catalytically active material provided thereon is also generated hereby at the same time during the manufacture of the substrate 52.

Should, for example, the SCR catalytic converter unit 32 of the SCR catalytic converter units 32, 34, 36 connected in parallel to one another be the SCR catalytic converter unit that is operated during a start operating phase or/and during a low-load operating phase, this may be dimensioned, in principle, such that it is smaller or has a lower thermal capacity than the SCR catalytic converter units 34, 36 not to be operated during the start operating phase or/and during the low-load operating phase. This can be achieved, for example, by the substrate 52 of the SCR catalytic converter unit 32 having a smaller cross-sectional dimension, i.e., diameter D, or/and length L in the exhaust gas flow direction A than do the substrates of the SCR catalytic converter units 34, 36. The number of the exhaust gas flow cells 54 in the substrate of the SCR catalytic converter unit 32 may also be smaller than the number of the duct-like exhaust gas flow cells 54 extending, for example in the longitudinal direction of the substrate in the substrates of the SCR catalytic converter units 34, 36. For example, the substrate 52 of the SCR catalytic converter unit 32 may have a substrate diameter D in the range of about 14 cm to 27 cm (5.7" to 10.5") in case of a circular cross-sectional geometry, while the substrates of the SCR catalytic converter units 34, 36 may have a diameter in the range of about 24 cm to 33 cm (9.5" to 13.0"). The density of the exhaust gas flow cells in the substrate of the SCR catalytic converter unit 32 may be in the range of 1290 to 2580 exhaust gas flow cells per $cm^2$ (200 to 400 exhaust gas flow cells per square inch), while the density of the exhaust gas flow cells in the substrates of the SCR catalytic converter units 34, 36 may be in the range of 2580 to 3870 exhaust gas flow cells per $cm^2$ (400 to 600 exhaust gas flow cells per square inch). This also makes it possible to achieve that the SCR catalytic converter units active during operating phases with a higher load and hence also with a higher pollutant discharge have a larger catalytic converter surface of the catalytic converter material intended for carrying out the catalytic reaction than the SCR catalytic converter unit 32 to be activated during the start operating phase, in which the focus is on reaching the temperature of the catalytically active material that is necessary for the catalytic reaction as quickly as possible. The exhaust gas flow cells or all exhaust gas flow cells 54 may have an approximately equal cross-sectional area in such substrates 52 with different numbers of exhaust gas flow cells per $cm^2$ for different SCR catalytic converter units 32, 34, 36, i.e., different cell densities for these SCR catalytic converter units. The consequence of this is that the wall thickness W between mutually adjacent cells is greater in a substrate 52 with a lower cell density, as it can be used, for example, for the SCR catalytic converter unit 32, than in substrates 52 with a higher cell density. As a result of this, a comparatively high mechanical stability can likewise be achieved in case of the use of a substrate-forming material with a higher porosity for substrates 52 with a lower cell density. Provisions may be made in an alternative embodiment for substrates 52 with a higher cell density to have cells with a smaller cross-sectional area than do substrates 52 with a lower cell density.

In order to keep the thermal mass of the SCR catalytic converter unit 32 as low as possible, the substrate of this catalytic converter unit may be provided with a substrate-forming material with a higher porosity compared to that of the substrates of the SCR catalytic converter units 34, 36 in which the structural embodiment is focused less on the smallest possible thermal mass but rather on the greatest possible robustness and hence on the longest possible service life, because it can basically be assumed that exhaust gas flows through these SCR catalytic converter units not to be operated during the start operating phase over longer time periods during the operation of an internal combustion engine or of an exhaust system than through the SCR catalytic converter unit 32 to be operated during the start operating phase or/and during a low-load operating phase. A higher porosity of the substrate-forming material also leads to a larger catalytic converter surface effective for carrying out the catalytic reaction, because not only the inner surface of the exhaust gas flow cells 54, but also the entire inner surface of the porous structure is available for this.

The SCR catalytic converter units 34, 36 of the SCR catalytic converter units 32, 34, 36 connected in parallel to one another, which are not to be operated during the start operating phase and during the low-load operating phase, may have, in principle, an identical design, but they may also differ in at least one of the above-mentioned parameters in order to achieve a greater variability. Further, it should be noted that it is also possible to provide more than three catalytic converter units connected in parallel to one another, so that an optimal adaptation to the particular discharged exhaust gas stream can also be achieved depending on the size of an internal combustion engine and the exhaust gas stream to be expected during different operating phases of the internal combustion engine by combining a plurality of SCR catalytic converter units.

The SCR catalytic converter unit 24, which is or can be connected in series, may have the same configuration as one of the catalytic converter units 32, 34, 36 connected in parallel to one another.

The procedure according to the present invention is not limited to the application in diesel internal combustion engines, but it could also be operated, for example, in case of gasoline applications in case of the so-called lean gasoline engines, which are operated with a lambda value higher than 1.

Figure 3:
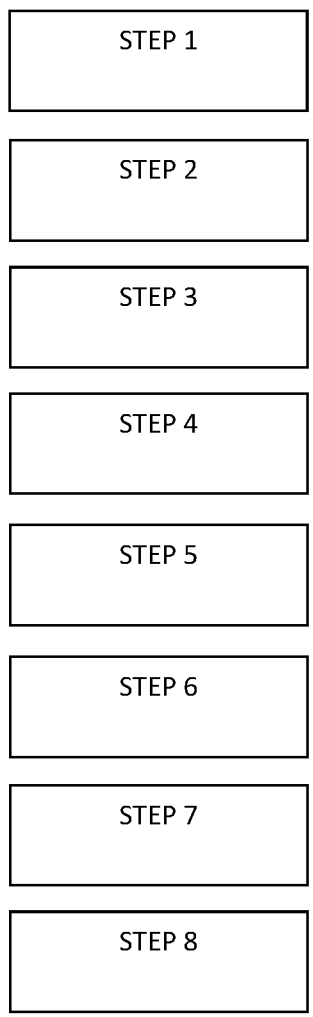
FIG. 3 is a schematic diagram showing steps of a process for operating the exhaust gas treatment system of FIG. 1.

FIG. 3 shows the steps of a process for operating the exhaust treatment system of FIG. 1. In step 1, an exhaust gas treatment system is provided and it is determined whether the combustion engine is in a start operating phase or a low-load operating phase or is in a first load operating phase being a partial load operating phase that is different from the start operating phase and the low-load operating phase or is in a second load operating phase being a full load operating phase of the internal combustion engine (step 2). Not all the SCR catalytic converter units connected in parallel to one another are released for the flow of exhaust gas during the start operating phase or during a low-load operating phase of the internal combustion engine (step 3).

In step 4, in order to make it possible to guarantee optimal exhaust gas purification after a longer operation, i.e., when the system has been heated up and the exhaust gas temperature has increased, it is provided that during the first load operating phase of the internal combustion engine, which is different from the start operating phase or from the low-load operating phase, at least one SCR catalytic converter unit of the SCR catalytic converter units connected in parallel to one another, which said SCR catalytic converter unit is released for the flow of exhaust gas during the start operating phase or during the low-load operating phase, and at least one SCR catalytic converter unit of the SCR catalytic converter units connected in parallel to one another, which said SCR catalytic converter unit is not released for the flow of exhaust gas during the start operating phase or during the low-load operating phase, be released for the flow of exhaust gas.

In step 5, provisions may be made, for example, for not all of the SCR catalytic converter units of the SCR catalytic converter units connected in parallel to one another, which former SCR catalytic converter units are not released for the flow of exhaust gas during the start operating phase or during the low-load operating phase, be released simultaneously for the flow of exhaust gas during the first load operating phase.

In step 6, in order to ensure that an approximately uniform load and hence also an approximately uniform aging of the SCR catalytic converter units is achieved over the service life, it is proposed that SCR catalytic converter units of the SCR catalytic converter units connected in parallel to one another, which former SCR catalytic converter units were not released for the flow of exhaust gases in the start operating phase or in the low-load operating phase, be released alternatingly for the flow of exhaust gas.

In step 7, provisions may be made in the second load operating phase of the internal combustion engine, which is different from a start operating phase or from a low-load operating phase, for no SCR catalytic converter unit of the SCR catalytic converter units connected in parallel to one another, which SCR catalytic converter unit was released for the flow of exhaust gas during the start operating phase or during the low-load operating phase, to be released for the flow of exhaust gas, and for at least one SCR catalytic converter unit of the SCR catalytic converter units connected in parallel to one another, which SCR catalytic converter unit was not released for the flow of exhaust gas during the second load operating phase, and preferably for each SCR catalytic converter unit of the SCR catalytic converter units connected in parallel to one another, which SCR catalytic converter unit was not released for the flow of exhaust gas during the start operating phase or during the low-load operating phase, to be released for the flow of exhaust gas. An overload of the SCR catalytic converter unit or SCR catalytic converter units active during the start operating phase or during the low-load operating phase can thus be avoided.

In step 8, provisions may be made in a third load operating phase of the internal combustion engine, which is different from a start operating phase, for no SCR catalytic converter unit of the SCR catalytic converter units connected in parallel to one another, which SCR catalytic converter unit was not released for the flow of exhaust gas during the start operating phase, to be released for the flow of exhaust gas.

While specific embodiments of the invention have been shown and described in detail to illustrate the application of the principles of the invention, it will be understood that the invention may be embodied otherwise without departing from such principles.

What is claimed is:

1. An exhaust gas treatment system for an exhaust system of an internal combustion engine, the exhaust gas treatment system comprising:
    a plurality of SCR catalytic converter units;
    a parallel branch line configuration connecting the plurality of SCR catalytic converter units in parallel to one another, wherein a plurality of SCR catalytic converter units of the plurality of SCR catalytic converter units connected in parallel to one another is selectably releasable and blockable for flow of exhaust gas by means of a blocking element associated with each one of the plurality of SCR catalytic converter units selectably releasable and blockable for the flow of exhaust gas, wherein, for providing mutually different catalytic converter capacities, at least two SCR catalytic converter units of the plurality of SCR catalytic converter units selectably releasable and blockable for flow of exhaust gas have mutually differently sized catalytic converter surfaces, effective for carrying out a catalytic reaction, relative to each other;
    at least one further SCR catalytic converter unit connected in series to the plurality of SCR catalytic converter units connected in parallel to one another, a blocking element being associated with the at least one further SCR catalytic converter unit connected in series with the plurality of SCR catalytic converter units connected in parallel to one another for optionally releasing and blocking the flow of exhaust gas.

2. The exhaust gas treatment system in accordance with claim 1, wherein the branch line configuration is configured to selectably release and block each of the plurality of SCR catalytic converter units.

3. The exhaust gas treatment system in accordance with claim 1, wherein
    said at least two SCR catalytic converter units have different $NH_3$ storage volumes relative to each other.

4. The exhaust gas treatment system in accordance with claim 1, wherein:
    the plurality of SCR catalytic converter units each comprise a substrate coated with catalytically active material or made with a catalytically active material;
    each of the plurality of SCR catalytic converter units comprise exhaust gas flow cells formed in each substrate; and
    at least two of the plurality of SCR catalytic converter units comprise:
        substrates with different numbers or/and densities of exhaust gas flow cells; or
        substrates with different wall thicknesses between mutually adjacent exhaust gas flow cells; or
        substrates with different cross-sectional dimensions or/and cross-sectional geometries of the exhaust gas flow cells provided therein; or
        substrates with different cross-sectional dimensions or/and lengths in an exhaust gas flow direction or/and volumes; or
        substrates with different substrate-forming materials; or
        substrates with different porosities of the substrate-forming materials; or extruded substrates coated or made with different catalytically active materials; or any combination of substrates
with different numbers or/and densities of exhaust gas flow cells; and
with different wall thicknesses between mutually adjacent exhaust gas flow cells; and
with different cross-sectional dimensions or/and cross-sectional geometries of the exhaust gas flow cells provided therein; and
with different cross-sectional dimensions or/and lengths in an exhaust gas flow direction or/and volumes; and
with different substrate-forming materials; and
with different porosities of the substrate-forming materials; and
with different catalytically active materials, wherein the substrate is an extruded substrate.

5. The exhaust gas treatment system in accordance with claim 4, wherein:
at least one of the plurality of SCR catalytic converter units is configured:
with a substrate with an exhaust gas flow cell density in the range of 1290 to 2580 exhaust gas flow cells per $cm^2$; or
with a substrate with a substrate diameter in the range of 14 cm to 27 cm; or
with a substrate with a substrate-forming material having a higher porosity; or
any combination of with a substrate with an exhaust gas flow cell density in the range of 1290 to 2580 exhaust gas flow cells per $cm^2$, and with a substrate with a substrate diameter in the range of 14 cm to 27 cm, and with a substrate with a substrate-forming material having a higher porosity; and
at least one of the plurality of SCR catalytic converter units is configured:
with a substrate with an exhaust gas flow cell density in the range of 2580 to 3870 exhaust gas flow cells per $cm^2$; or
with a substrate with a substrate diameter in the range of 24 cm to 33 cm; or
with a substrate with a substrate-forming material having a lower porosity; or
any combination of with a substrate with an exhaust gas flow cell density in the range of 2580 to 3870 exhaust gas flow cells per $cm^2$, and with a substrate with a substrate diameter in the range of 24 cm to 33 cm, and with a substrate with a substrate-forming material having a lower porosity.

6. The exhaust gas treatment system in accordance with claim 1, further comprising:
at least one further catalytic converter unit connected in series to the plurality of SCR catalytic converter units connected in parallel to one another; or
at least one particle filter unit connected in series to the plurality of SCR catalytic converter units connected in parallel to one another; or
at least one further SCR catalytic converter unit connected in series to the plurality of SCR catalytic converter units connected in parallel to one another and at least one particle filter unit connected in series to the plurality of SCR catalytic converter units connected in parallel to one another.

7. The exhaust gas treatment system in accordance with claim 6, wherein
the further catalytic converter unit connected in series to the plurality of SCR catalytic converter units connected in parallel to one another is an oxidation catalytic converter unit.

8. The exhaust gas treatment system in accordance with claim 1, further comprising at least one reactant introduction unit provided upstream in relation to each of the plurality of SCR catalytic converter units.

9. A process for operating an exhaust gas treatment system of an internal combustion engine, the process comprising:
providing the exhaust system of an internal combustion engine, wherein the exhaust gas treatment system comprises: a plurality of SCR catalytic converter units; and a parallel branch line configuration connecting the plurality of SCR catalytic converter units in parallel to one another, wherein a plurality of SCR catalytic converter units of the plurality of SCR catalytic converter units connected in parallel to one another is selectably releasable and blockable for flow of exhaust gas by means of a blocking element associated therewith;
determining whether the internal combustion engine is in a start operating phase or a low load operating phase or a first load operating phase or a second load operating phase engine, the first load operating phase being a partial load operating phase of the internal combustion engine different from the start operating phase and from the low-load operating phase of the internal combustion and the second load operating phase being a full-load operating phase of the internal combustion engine, and wherein:
if it is determined that the internal combustion engine is in the start operating phase of the internal combustion engine or the low-load operating phase of the internal combustion engine, at least one SCR catalytic converter unit of the plurality of SCR catalytic converter units selectably releasable and blockable for the flow of exhaust gas is blocked and at least one SCR catalytic converter unit of the plurality of SCR catalytic converter units selectably releasable and lockable for the flow of exhaust gas is released, so that not all of the plurality of SCR catalytic converter units selectably releasable and blockable for flow of exhaust gas are released for flow of exhaust gas during the start operating phase or during the low-load operating phase of the internal combustion engine,
if it is determined that the internal combustion engine is in the first load operating phase, at least one of said at least one SCR catalytic converter unit of the plurality of SCR catalytic converter units selectably releasable and lockable for the flow of exhaust gas, which is blocked and not released for the flow of exhaust gas during the start operating phase or during the low-load operating phase, is released,
if it is determined that the internal combustion engine is in the second load operating phase, said at least one SCR catalytic converter unit of the plurality of SCR catalytic converter units selectably releasable and lockable for the flow of exhaust gas, which is released for the flow of exhaust gas during the start operating phase or during the low-load operating phase, is blocked and each one of the SCR catalytic converter units of the plurality of SCR catalytic converter units selectably releasable and lockable for the flow of exhaust gas, which is not released for the flow of exhaust gas during the start operating phase or during the low-load operating phase, is released.

10. The process in accordance with claim 9, wherein:
not all the SCR catalytic converter units of the plurality of SCR catalytic converter units connected in parallel to one another, which SCR catalytic converter units are not released for the flow of exhaust gas during the start operating phase or during the low-load operating phase, are released simultaneously for the flow of exhaust gas during the first load operating phase;
the SCR catalytic converter units of the SCR catalytic converter units connected in parallel to one another, which SCR catalytic converter units are not released for the flow of exhaust gas during the start operating phase or during the low-load operating phase, are alternatingly released for the flow of exhaust gas during the first load operating phase.

11. The process in accordance with claim 9, wherein no SCR catalytic converter unit of the plurality of SCR catalytic converter units connected in parallel to one another, which SCR catalytic converter unit, is not released for the flow of exhaust gas during the start operating phase, is released for the flow of exhaust gas during a third load operating phase of the internal combustion engine, which third load operating phase is different from a start operating phase.

12. The process in accordance with claim 9, wherein the third load operating phase is the low-load operating phase of the internal combustion engine.

13. An exhaust gas treatment system for an exhaust system of an internal combustion engine, the exhaust gas treatment system comprising:
a first SCR catalytic converter unit;
a second SCR catalytic converter unit;
a parallel branch line configuration connecting the first SCR catalytic converter unit and the second SCR catalytic convert unit in parallel to one another;
a first blocking element associated with the first SCR catalytic converter unit, the first blocking element being configured to release a flow of exhaust gas to the first SCR catalytic converter unit and the first blocking element being configured to block the flow of exhaust gas to the first SCR catalytic converter unit;
a second blocking element associated with the second SCR catalytic converter unit, the second blocking element being configured to release the flow of exhaust gas to the second SCR catalytic converter unit and the second blocking element being configured to block the flow of exhaust to the second SCR catalytic converter unit, wherein, for providing mutually different catalytic converter capacities, the first SCR catalytic converter unit and the second SCR catalytic converter unit have mutually differently sized catalytic converter surfaces for carrying out a catalytic reaction, relative to each other;
a third SCR catalytic converter unit connected in series to the first SCR catalytic converter unit and the second SCR catalytic converter unit;
a third blocking element associated with the third SCR catalytic converter unit, the third blocking element being configured to release the flow of exhaust gas to the third SCR catalytic converter unit and the third blocking element being configured to block the flow of exhaust gas to the third SCR catalytic converter unit.

14. The exhaust gas treatment system in accordance with claim 13, wherein the branch line configuration is configured to selectably release and block each of the first SCR catalytic converter unit and the second SCR catalytic converter unit.

15. The exhaust gas treatment system in accordance with claim 13, wherein the first SCR catalytic converter unit and the second SCR catalytic converter unit have different $NH_3$ storage volumes relative to each other.

16. The exhaust gas treatment system in accordance with claim 13, wherein:
each of the first SCR catalytic converter unit and the second SCR catalytic converter unit comprises a substrate coated with catalytically active material or made with a catalytically active material;
each of the first SCR catalytic converter unit and the second SCR catalytic converter unit comprises exhaust gas flow cells formed in each substrate; and
the first SCR catalytic converter unit and the second SCR catalytic converter unit comprise:
substrates with different numbers or/and densities of exhaust gas flow cells; or
substrates with different wall thicknesses between mutually adjacent exhaust gas flow cells; or
substrates with different cross-sectional dimensions or/and cross-sectional geometries of the exhaust gas flow cells provided therein; or
substrates with different cross-sectional dimensions or/and lengths in an exhaust gas flow direction or/and volumes; or
substrates with different substrate-forming materials; or
substrates with different porosities of the substrate-forming materials; or
extruded substrates coated or made with different catalytically active materials; or
any combination of substrates
with different numbers or/and densities of exhaust gas flow cells; and
with different wall thicknesses between mutually adjacent exhaust gas flow cells; and
with different cross-sectional dimensions or/and cross-sectional geometries of the exhaust gas flow cells provided therein; and
with different cross-sectional dimensions or/and lengths in an exhaust gas flow direction or/and volumes; and
with different substrate-forming materials; and
with different porosities of the substrate-forming materials; and
with different catalytically active materials, wherein the substrate is an extruded substrate.

17. The exhaust gas treatment system in accordance with claim 16, wherein:
at least one of the first SCR catalytic converter unit and the second SCR catalytic converter unit is configured:
with a substrate with an exhaust gas flow cell density in the range of 1290 to 2580 exhaust gas flow cells per $cm^2$; or
with a substrate with a substrate diameter in the range of 14 cm to 27 cm; or
with a substrate with a substrate-forming material having a higher porosity; or
any combination of with a substrate with an exhaust gas flow cell density in the range of 1290 to 2580 exhaust gas flow cells per $cm^2$, and with a substrate with a substrate diameter in the range of 14 cm to 27 cm, and with a substrate with a substrate-forming material having a higher porosity; and
at least one of the first SCR catalytic converter unit and the second SCR catalytic converter unit is configured:

with a substrate with an exhaust gas flow cell density in the range of 2580 to 3870 exhaust gas flow cells per $cm^2$; or with a substrate with a substrate diameter in the range of 24 cm to 33 cm; or with a substrate with a substrate-forming material having a lower porosity; or any combination of with a substrate with an exhaust gas flow cell density in the range of 2580 to 3870 exhaust gas flow cells per $cm^2$, and with a substrate with a substrate diameter in the range of 24 cm to 33 cm, and with a substrate with a substrate-forming material having a lower porosity.

18. The exhaust gas treatment system in accordance with claim 13, further comprising:

a fourth catalytic converter unit connected in series to the first SCR catalytic converter unit and the second SCR catalytic converter unit connected in parallel to one another; or at least one particle filter unit connected in series to the first SCR catalytic converter unit and the second SCR catalytic converter unit connected in parallel to one another; or a fourth SCR catalytic converter unit connected in series to the first SCR catalytic converter unit and the second SCR catalytic converter unit connected in parallel to one another and at least one particle filter unit connected in series to the first SCR catalytic converter unit and the second SCR catalytic converter unit connected in parallel to one another.

19. The exhaust gas treatment system in accordance with claim 18, wherein the fourth catalytic converter unit connected in series to the first SCR catalytic converter unit and the second SCR catalytic converter unit connected in parallel to one another is an oxidation catalytic converter unit.

20. The exhaust gas treatment system in accordance with claim 13, further comprising at least one reactant introduction unit provided upstream in relation to each of the first SCR catalytic converter unit and the second SCR catalytic converter unit.

* * * * *